United States Patent [19]

Shafer et al.

[11] 3,911,678

[45] Oct. 14, 1975

[54] SAFETY SHUT-OFF FOR PUMP

[75] Inventors: Homer J. Shafer; David P. Gerber, both of Mansfield, Ohio

[73] Assignee: Shafer Valve Company, Mansfield, Ohio

[22] Filed: Nov. 7, 1974

[21] Appl. No.: 521,764

[52] U.S. Cl. ............... 60/400; 60/403; 60/416; 60/477
[51] Int. Cl.² ............................................. F15B 20/00
[58] Field of Search ............ 60/385, 400, 403, 404, 60/405, 416, 428, 429, 477

[56] References Cited
UNITED STATES PATENTS

| | | | |
|---|---|---|---|
| 2,791,093 | 5/1957 | Shafer | 60/400 |
| 2,849,987 | 9/1958 | Shafer | 91/461 |
| 3,069,855 | 12/1962 | Denkowski et al. | 60/400 |
| 3,089,430 | 5/1963 | Shafer et al. | 92/6 X |

Primary Examiner—Edgar W. Geoghegan
Attorney, Agent, or Firm—Hamilton, Renner & Kenner

[57] ABSTRACT

A safety shut-off valve for a stand-by piston type hand pump to be used for manual operation of a fluid motor normally operated by a source of fluid pressure. A control valve selectively connects the pump to a pressure fluid storage so that fluid can be pumped manually to and from the motor when the source of fluid pressure fails. The safety shut-off valve is located in the suction line of the control valve and is operatively connected to the power source in advance of the fluid storage.

4 Claims, 2 Drawing Figures

SAFETY SHUT-OFF FOR PUMP

BACKGROUND OF THE INVENTION

The invention is particularly adapted for use in a stand-by pump and valve unit for manually operating a hydraulic operator for a pipe line valve when the source of power for normal operation has failed. This may occur when the hydraulic valve operator motor is powered by a fluid storage supply subjected to the pipe line pressure and the pressure fails or drops substantially due to a pipe line break or other condition normally effecting closure of the pipe line valve. In such event the control valve in the pump unit can be manually positioned to connect the pump to the fluid storage supply for manual operation of the hydraulic motor. If a pressure surge occurs in the supply line from the pipe line during a suction stroke or during a reversal of the control valve in the manual operation, pressure fluid throws the pump piston and the handle connected thereto upwardly or outwardly with great and sudden force, creating a hazardous situation and subjecting the person operating the pump to great danger and injury.

U.S. Pat. No. 3,089,430 discloses a safety shut-off valve located in the suction line to a piston pump which is manually operated selectively to actuate the hydraulic operator and close a main valve in the pipe line, and the safety shut-off valve constitutes a piston connected to the ball check which opens the fluid supply to the pump on the suction stroke, the piston being exteriorly exposed to atmosphere and operating by differential pressure to cause the ball check to close the suction line in the event of a pressure surge in the supply line.

This prior safety shut-off was ordinarily successful but, due to the exposure of the shut-off piston to the atmosphere, it often became covered with foreign matter or corrosion, or was inadvertently painted over by maintenance men, so that in the event of a pressure surge it sometimes acted too slowly to prevent the fluid from reaching the pump and throwing the handle outwardly. Moreover, such slow or faulty action of the shut-off piston frequently interfered with manual operation of the pump because the ball check to which it was connected would fail to open at the start of the suction stroke, causing the pump to pull a partial vacuum.

SUMMARY OF THE INVENTION

It is an object of the present invention to provide a novel and improved safety shut-off for a manually operated pump and valve unit selectively connectible to a fluid pressure supply.

Another object is to provide an improved safety shut-off for a manually operated pump selectively connected to a fluid storage supply subjected to a power source, said shut-off being directly connected to the power source in advance of the fluid storage supply.

A further object is to provide an improved totally enclosed safety shut-off for a manually operated pump selectively connectible to a liquid storage supply subjected to a fluid power source, said shut-off being connected to the power source in advance of the liquid storage supply, whereby a surge of pressure from the power source activates the shut-off before the surge is transmitted thereto from the storage supply.

A still further object is to provide an improved safety shut-off for a manually operated pump selectively connectible to a fluid power source, which will not interfere with normal operation of the pump.

These and other objects are accomplished by the improvements comprising the present invention, a preferred embodiment of which is shown by way of example in the accompanying drawings and described in detail in the following specification. Variations in details of construction and modifications are comprehended within the scope of the appended claims.

DESCRIPTION OF A PREFERRED EMBODIMENT

Figure 1:
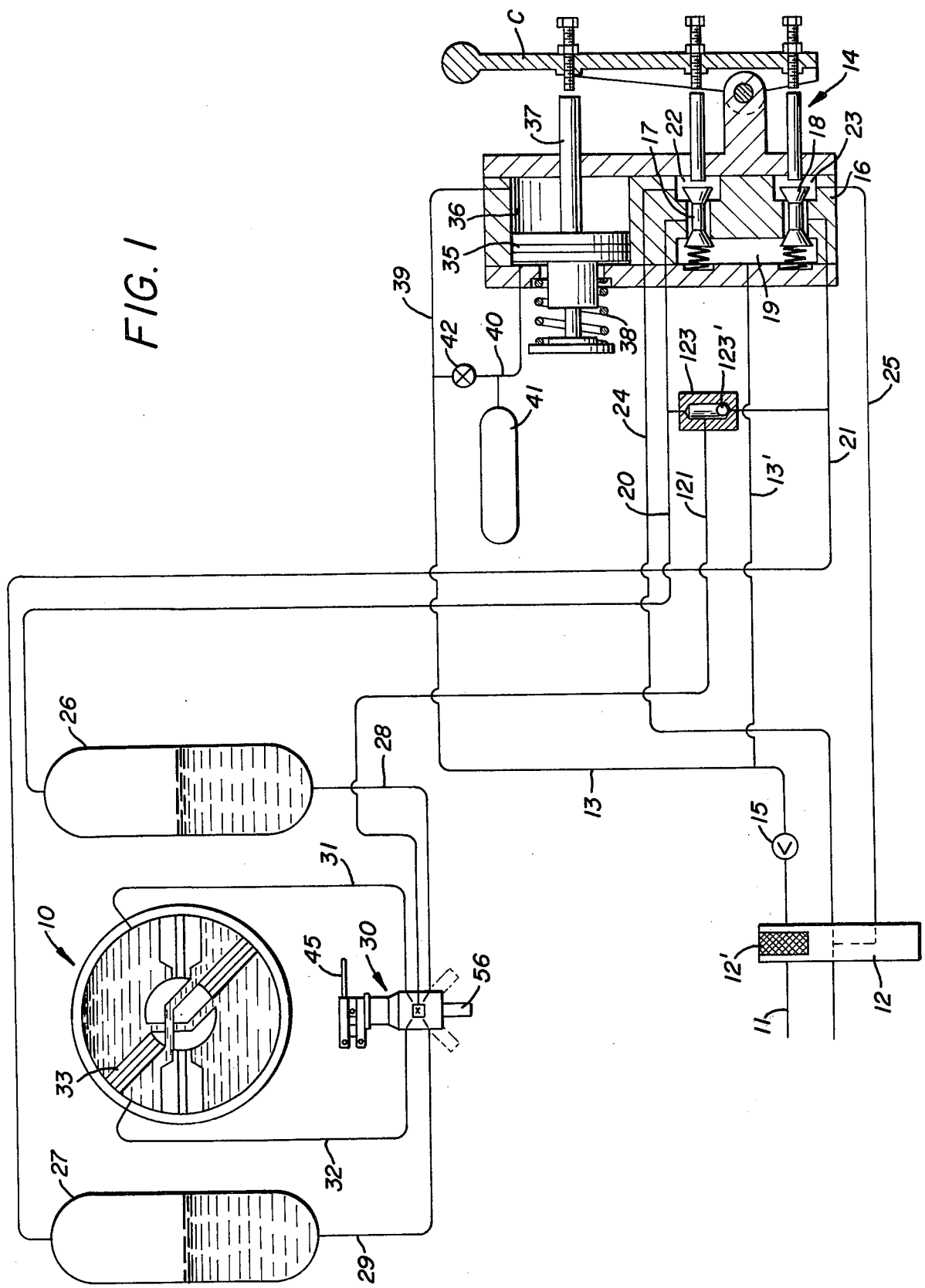
FIG. 1 is a schematic view illustrating a system for actuating a hydraulic operator to close a valve in a pipe line upon a substantial drop in pressure in the line, the power for actuating the operator being supplied from the pipe line.

The hydraulic system shown is similar to that disclosed in U.S. Pat. No. 2,849,987, and includes a bydraulic rotary vane motor operator 10 which is operatively mounted on the valve stem of a rotary plug valve (not shown) in a pipe line. The pressure fluid which supplies the power for normal automatic operation of the motor 10 is derived from the pipe line which may carry gas under pressure.

The pipe line is connected by a line 11 to a junction block 12 having a strainer 12' therein, and a line 13 leads from the junction block to a control unit indicated generally at 14. Preferably, the power line 11 is connected by tap lines to the pipe line on both sides of the pipe line valve so that power will be supplied from line 11 regardless of line drop or break on either side of the valve the pipe line. A check valve 15 in line 13 prevents return flow therein.

The control unit 14 preferably includes a poppet control valve 16 having two double-headed poppet valves 17 and 18 normally closing off the pressure chamber 19 to which power supply line 13' is connected, and arranged selectively to connect said chamber with one of the lines 20 or 21 leading to the hydraulic motor operator 10 which connecting the other line to an exhaust chamber 22 or 23 to which the exhaust lines 24 or 25 are connected, the exhaust lines being connected through the junction block 12 to an exhaust (not shown). A control handle C is pivoted on the control valve 16 for operating the poppet valves.

Preferably, the supply or exhaust lines 20 and 21 are connected to the upper ends of oil cylinders 26 and 27, respectively, for the purpose of forcing oil through the motor 10 in a closed circuit so that flow through the motor can be easily controlled. The lower ends of the cylinders are connected by lines 28 and 29 to the hand pump and valve unit indicated generally at 30, and from unit 30 to opposite sides of the vane 33 of the rotor by lines 31 and 32.

Assuming the hand pump is in neutral position, when the control handle C is operated to actuate poppet valve 18, gas pressure from chamber 19 flows through line 21 to oil cylinder 27 forcing oil to flow through lines 29 and 32 (by-passing the hand pump) into the operator motor 10 and rotates the vane 33 therein to close the pipe line valve to which the motor is connected. Oil exhausts through lines 31 and 28 to cylinder 26, causing gas to exhaust through line 20 into exhaust chamber 22 of the poppet control, and then through line 24 to the junction block.

A pressure-operated pilot device is provided to operate the poppet valve in response to a substantial drop in pressure in the pipe line, and comprises a piston 35 in a cylinder 36 having a piston rod 37 adapted selectively to actuate the handle C of the poppet control 14. A coil spring 38 normally urges the piston 35 to its inner or inoperative position as shown. The outer end of the cylinder 36 is connected by a line 39 to the power line 13, and the inner end of the cylinder is connected by a line 40 to an auxiliary pressure storage tank 41 and is also connected through a reduced orifice 42 to the line 39.

In the operation of the hydraulic system, the pipe line valve is normally open and pressure from the line is supplied to the pressure chamber 19 of control unit 14 and to both sides of the pilot piston through lines 39 and 40, holding the piston in inoperative position. Line pressure is also maintained in tank 41 through orifice 42. In the event of a substantial pressure drop in the pipe line, as in the case of a line break, before the drop can take effect on the tank 41 through reduced orifice 42, the greater pressure in line 40 from tank 41 will actuate the piston 35 and operate the handle C which will in turn open poppet valve 18 to actuate the hydraulic motor 10 and close the pipe line valve.

The construction and operation of the hydraulic operator control system thus far described per se forms no part of the present invention.

Figure 2:
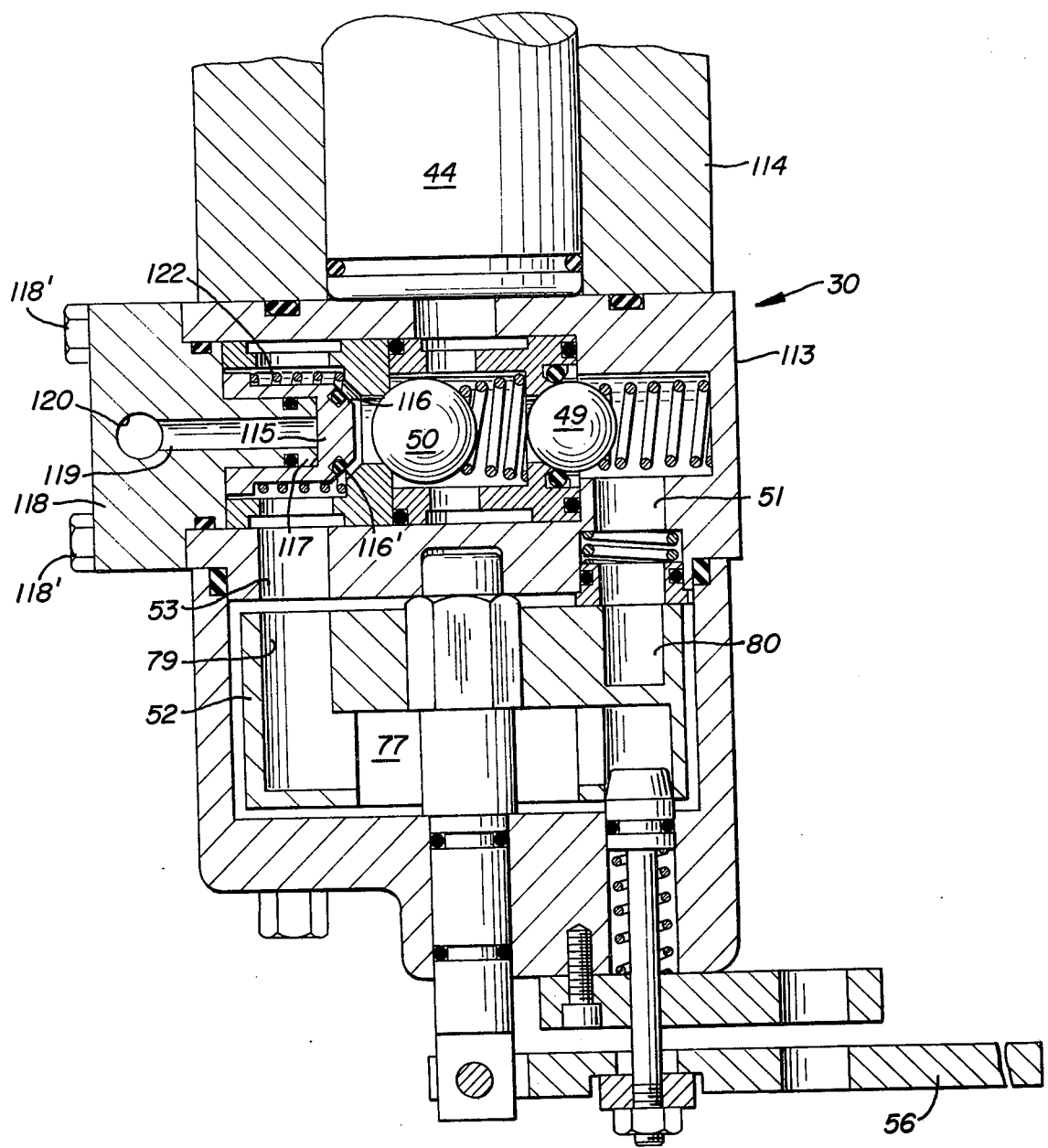
FIG. 2. is an enlarged cross section of the stand-by hand pump and control valve unit which is selectively connectible to the hydraulic operator.

The construction and operation of the hand pump and control valve unit 30 is fully described in U.S. Pat. No. 3,089,430, except for the improved safety shut-off constituting the present invention. Referring to FIG. 2 herein, the unit 30 has a rotary valve disk 52 rotatable by hand lever 56 to a neutral position wherein the pressure fluid from the poppet valve 14 bypasses the piston pump 44 and goes directly to and from the rotary hydraulic motor. The disk is also rotatable to the operative position shown wherein the pump is connected in the hydraulic circuit for forcing flow of oil from one of the tanks 26 or 27 through the motor 10 and returning it to the other tank.

The intermediate disk section 113 between the rotary valve disk 52 and the pump housing 114 encloses the check valves for the pump suction and discharge and the connections thereto.

In the operative position shown, the pressure fluid from line 29 passes into the central annular chamber 77 and on the suction stroke of the pump the fluid is sucked through vertical port 79 and port 53 in the intermediate section past the ball check 50 to the pump piston. On the downstroke of the piston ball check 50 closes and ball check 49 opens, allowing fluid to pass through ports 51 and 80 which are connected to the line 32 leading to the pressure side of the motor 10. Fluid exhausting from the motor passes from line 31 through the unit 30 and into the exhaust line 28. The disk 52 is rotatable also to a reverse operating position to reverse the flow through the motor 10 for the hand pump operation. The construction and operation of the pump and control valve unit thus far described is described in greater detail in said U.S. Pat. No. 3,089,430, and per se forms no part of the present invention.

The safety shut-off of the present invention comprises a piston valve 115 in the section 113 between the port 53 and the ball check 50, the piston having a beveled surface 116 for seating on the valve seat surrounding the port leading to check valve 50. Preferably, a gasket 116' is provided in said seating surface 116. The piston 115 has a cylindrical internal bore slidably fitting over a hollow cylindrical stud 117 projecting inwardly from a plate 118 bolted by bolts 118' to the exterior of the check valve section 113, and the bore 119 of the stud communicates with a pilot passageway 120 which is connected to the pilot line 121 shown in FIG. 1. A coil spring 122 urges the piston 115 to the normally open position shown in FIG. 2.

As shown in FIG. 1, the pilot line 121 is connected to the side of a shuttle valve 123, the ends of which are connected to the supply and exhaust line 20 and 21. The shuttle valve has a valve element 123' movable between the ends of the valve for closing off the end connected to the line carrying the lower pressure. This ensures that the pilot line is always connected to the line carrying the higher pressure.

In the operation of the system, a substantial pressure drop in the pipe line will operate the rotary motor operator in the manner previously described to close the pipe line valve, and as long as there is any pressure in the pipe line it is transmitted through the pilot line 121 to hold piston 115 closed and disconnect or deactivate the hand pump. When there is a substantial drop in pressure in the pipe line, the spring 122 opens the piston valve 115 and allows operation of the hand pump in the manner previously described to circulate the oil to and from tanks 26 and 27 and rotate the operator 10 to open or close the pipe line valve depending upon the position of control handle 56.

During such hand pump operation if the pressure in the pipe line comes on it is immediately transmitted to one or the other of the oil tanks and thence to the suction line of the pump which, in the absence of the safety shut-off, will cause the piston 44 and the pump handle 45 attached thereto to be thrown outwardly with great force. This force is often great enough to tear the top off the pump housing and is extremely dangerous to the operator and others in the vicinity. The same result may happen if the control handle is left in such position after its last operation that the suction line is open to the pump. With the safety shut-off piston valve 115 connected by the pilot line 121 and shuttle valve 123 to the pressure supply lines 20 and 21, any pressure surge from the pipe line instantly closes the piston 115 and disconnects the pump before the pressure surge acts on the oil in tank 26 or 27 to circulate the oil through the unit 30 to the hand pump. In other words, the oil in tank 26 or 27 acts as a dash pot to cause a time delay in transmitting the pressure surge to the pump, thus ensuring that the pressure in the pilot line will close the piston valve 115 and shut off the suction line to the pump before the pressure fluid from the oil tank reaches it.

The improved safety shut-off is totally enclosed so that its operation can not be impaired by corrosion or foreign matter, as in the case with the safety shut-off of U.S. Pat. No. 3,089,430. Moreover, the present shut-off is completely foolproof as it is connected to the power source in advance of the liquid storage supply which is subjected to pressure for automatic operation of the valve operator and which is also used for hand pump operation.

I claim:

1. A safety shut-off for a reciprocating piston type hand pump connectible to a fluid storage reservoir connected to a source of pressure, there being control valve means for selectively connecting said hand pump to said storage reservoir and having suction and discharge passageways selectively connectible with said pump, a ball check for normally closing said suction passageway and for opening said passageway during the suction stroke of the pump, and a normally open safety piston valve in said suction passageway operably connected to said source of pressure in advance of said fluid storage reservoir for closing off said suction passageway upon to a sudden increase in source pressure.

2. A safety shut-off as described in claim 1, in which spring means is provided for urging said safety piston valve to open position.

3. In combination, a hydraulic motor connected to a fluid storage reservoir, and conduit means connecting said reservoir to a source of pressure for normal operation of said motor, a reciprocating piston type hand pump, control valve means for selectively connecting said hand pump to said reservoir for operating said motor, said control valve means having suction and discharge passageways selectively connectible with said pump, a ball check for normally closing said suction passageway and for opening said passageway during the suction stroke of the pump, a safety piston valve in said suction passageway, and conduit means connecting said piston valve to said source of pressure in advance of said fluid storage reservoir whereby a surge in source pressure will actuate said safety piston valve to close off said suction passageway before the surge is transmitted through the reservoir to the pump.

4. The combination as described in claim 3, in which spring means is provided for urging said safety piston valve to open position.

* * * * *